Oct. 27, 1925.
A. VEILLETTE
1,559,480
SAFETY CATCH
Filed Dec. 28, 1923
2 Sheets-Sheet 1
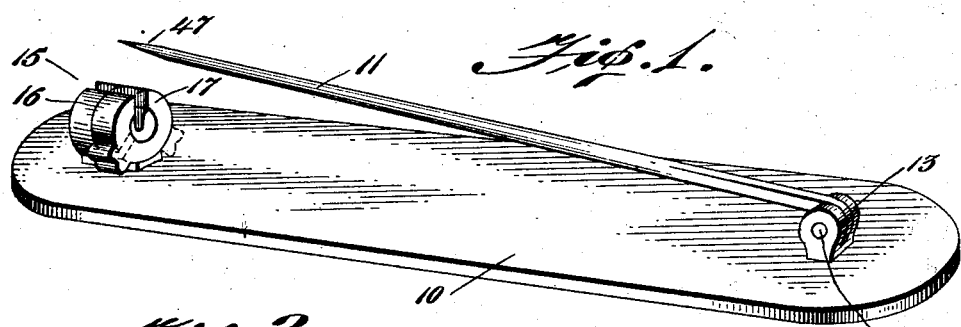
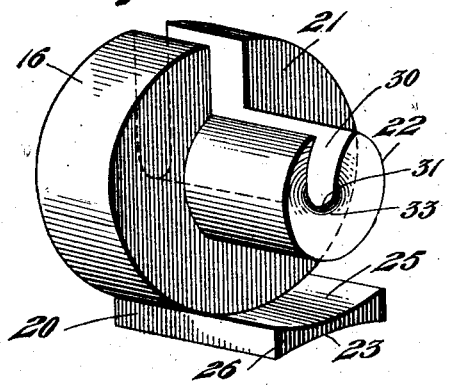
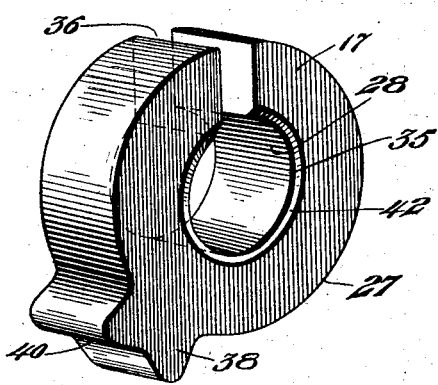
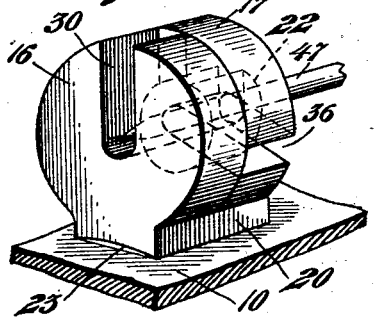
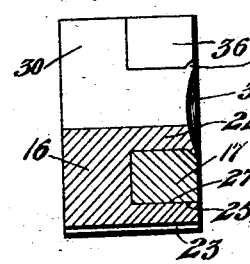
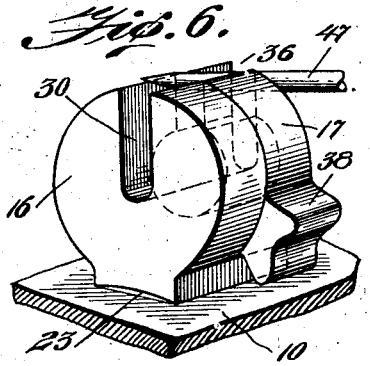
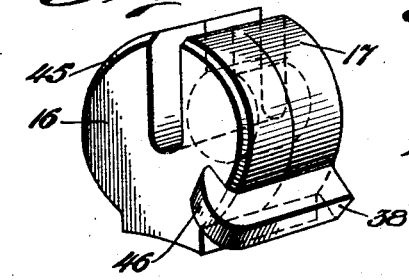
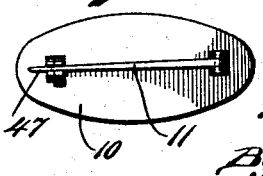
Inventor
Alfred Veillette
By Thomas A. Jenckes Jr.
Attorney Oct. 27, 1925.

A. VEILLETTE 1,559,480

SAFETY CATCH

Filed Dec. 28, 1923    2 Sheets-Sheet 2

Inventor
Alfred Veillette
By Thomas A. Jenks Jr.
Attorney

Patented Oct. 27, 1925.

1,559,480

UNITED STATES PATENT OFFICE.

ALFRED VEILLETTE, OF ATTLEBORO, MASSACHUSETTS, ASSIGNOR TO JAMES C. DORAN & SONS, OF PROVIDENCE, RHODE ISLAND, A CORPORATION OF RHODE ISLAND.

SAFETY CATCH.

Application filed December 28, 1923. Serial No. 683,192.

*To all whom it may concern:*

Be it known that I, ALFRED VEILLETTE, citizen of the United States, residing at Attleboro, in the county of Bristol and State of Massachusetts, have invented certain new and useful Improvements in Safety Catches, of which the following is a specification.

My invention relates to improvements in safety catches for pins, brooches and the like, and improvements in the art of manufacture thereof.

I am aware that hitherto safety catches comprising a longitudinally slotted stationary member and a longitudinally slotted revoluble guard or locking member have been made. My invention relates to improvements in safety catches of this particular type. Hitherto so far as I am aware, the revoluble member has either been revolved within a stationary tube, or where not ears on both sides of the stationary member have been provided to limit the longitudinal movement of the revoluble member. My invention eliminates one of these ears and provides improved means to secure the revoluble member against longitudinal movement on the stationary member, and to keep it in constant alignment therewith, by means of mounting it on a post or trunnion extending longitudinally from the stationary member, thereby enabling the outer member to be the revoluble member and eliminating the excess metal formerly used to contain the revoluble member. As will presently appear, my invention may be quickly and readily fabricated from wire stock on an automatic screw machine.

One object of my invention therefor is to provide a safety catch for pins of such simplified construction that it can be cheaply and efficiently turned out from wire stock in large numbers on a screw, turret or similar type of automatic machine.

A further object of my invention is to provide a safety catch of such simplified construction that it can be readily turned out in minute sizes, a very desirable feature for safety catches, as a minimum amount of precious metal stock need be employed. Safety catches of minute size are also especially adapted for use on small school or fraternity emblems.

A further object of my invention is to provide a safety catch of improved construction of the general type mentioned above wherein the necessary bearing points are provided with the use of a minimum quantity of stock. The use of ears or outer shells which have formerly been used to align the revoluble member and to prevent it from longitudinal movement are eliminated.

A further object of my invention is to provide improved means for attaching the base of the safety catch to the pin.

A further object of my invention is to provide improved means of more simple construction than hitherto to prevent the revoluble member from longitudinal movement.

A further object of my invention is to provide improved means for aligning the longitudinal slots in the revoluble and stationary members for insertion and removal of the pin tongue.

A further object of my invention is to provide a safety catch which may be simply and positively assembled.

A further object of my invention is to provide a jam-proof safety catch provided with bearing points to secure the catch against vertical movement, thereby always permitting revolution of the revoluble member on the stationary member. I accomplish this by providing an arcuate concaved surface on the upper portion of the base of the stationary member for the outer periphery of the revoluble annular member to bear against. As these surfaces are continually in contact, it is impossible to bear down on the stationary member to get it out of alignment for the proper registration of the end of the pin tongue therein, a defect so common in most types of safety catches now on the market.

These and such other objects of my invention which may hereinafter appear will be best understood from a description of one embodiment thereof, such as is shown in the accompanying drawings.

In the drawings, Fig. 1 is a perspective view of the back or attaching side of a pin having my improved safety catch mounted thereon.

Fig. 2 is a perspective view of the stationary member of my improved safety catch.

Fig. 3 is a perspective view of the revoluble member thereof.

Fig. 4 is a perspective view of my improved safety catch showing the pin tongue in locked position.

Fig. 5 is a longitudinal section of my improved safety catch in unlocked position, showing the longitudinal slots in alignment for insertion or removal of the pin tongue.

Fig. 6 is a perspective view of my improved safety catch in unlocked position, showing the end of the pin tongue being inserted therein.

Fig. 7 is a perspective view of a modified form of my safety catch, showing a different means for securing the revoluble member against longitudinal movement.

Fig. 8 is a rear view of my improved safety catch in use on a small fraternity or school emblem.

Figure 9:
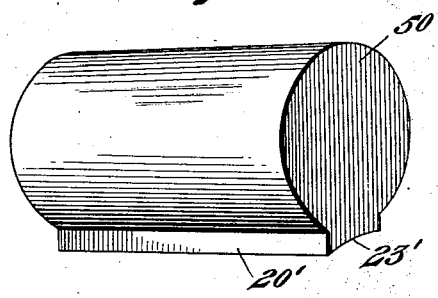
Fig. 9 is a perspective view of a piece of wire stock drawn with a base protuberance thereon.

In the drawings, wherein like characters of reference indicate like parts throughout, 10 represents the body portion of a pin having the usual pin tongue 11, suitably pivoted thereto by means of the pintle 12 in a bearing 13 mounted on the body portion 10.

My improved safety catch 15 is shown mounted at the opposite end of the pin body portion 10. The catch 15 comprises the stationary member 16 and revoluble guard member 17, preferably of annular shape. It will be observed that as one is so to speak the complement of the other, they may both be readily cut out of the same piece of wire stock with a minimum amount of waste, and when assembled form a compact fit.

The stationary member 16 comprises the base 20, body portion 21, and cylindrical trunnion 22, all preferably integrally cut out from the same piece of stock. The base 20 extends longitudinally the length of the assembled catch 15 and has its entire lower surface transversely concaved as at 23, so that the base 20 may be readily soldered to the body portion 10 without leaving solder protruding therefrom and to maintain it in a more even vertical position, the solder being retained in the concave portion 23. The body portion 21 of the stationary member extends upwardly from one end of the base 20, and is preferably of general cylindrical formation. The upper surface 25 of the opposite end 26 of the base 20 is of arcuate concave formation of substantially similar radius to that of the outer periphery 27 of the annular revoluble member 17. Projecting longitudinally the length of the base 20 over the concave upper surface 25 thereof, approximately centrally of the body portion 21, is a cylindrical post or trunnion 22 of approximately similar radius to the inner periphery 28 of the revoluble member 17. The stationary member 16 is longitudinally slotted as at 30, preferably for ease of construction throughout its entire length, to a line 31 slightly below the center of the body portion 21 and trunnion 22, said line 31 being approximately half the diameter of the pin tongue 11, below the center of said body portion 21 and trunnion 22. The outer end of the trunnion is preferably concaved as at 33 for a purpose to be described.

The revoluble guard member 17 is preferably annular and may be conveniently cut out of the same piece of wire stock as the stationary member 16. It is provided with a central longitudinal bore 35 and the longitudinal radial slot 36. A finger piece 38 is raised from the outer periphery 27 of the ring member 17 preferably at a predetermined distance from the slot 36 for a purpose to be described. Said finger piece may be conveniently provided with the finger depression 40. The outer end of the inner periphery 28 of the ring 17 in the preferred embodiment is countersunk, preferably beveled as at 42, as shown in Figs. 3 and 5.

In Fig. 7 I show a modified form of my invention, wherein the finger piece 38 is extended to serve as a means to lock the revoluble member 17 to the stationary member 16 against longitudinal movement. The outer edge of the outer end of the outer periphery of the stationary member 16 is preferably bevelled as at 45, and the finger piece 38 is extended outwardly as at 46, for a slightly longer distance than the length of the catch 15. After assembling, the projecting outer end 46 of the finger piece 38 is bent over the bevelled portion 45 of the outer end of the stationary member 16, said end 46 thus serving to secure the ring 17 to the stationary member 16 against longitudinal movement. In this construction countersinking the end of the trunnion 22 into the revoluble member 17 is unnecessary.

Fig. 8 illustrates my improved safety catch 15 in use on a class or fraternity pin with the end 47 of the pin tongue 11 protruding through the catch, so that it may be more readily withdrawn therefrom.

Figure 13:
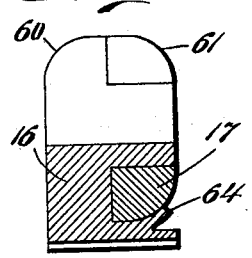
Fig. 13 is a sectional view of a modified form of safety catch, embodying my invention, having different means for retaining the revoluble member to the stationary member.
Figure 14:
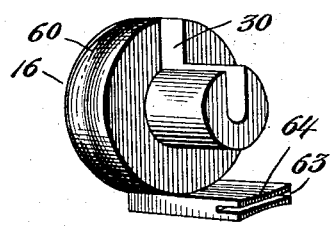
Fig. 14 is a perspective view of the stationary member thereof.
Figure 15:
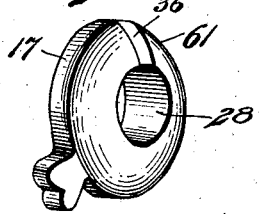
Fig. 15 is a perspective view of the revoluble member thereof.

Figs. 13, 14 and 15 illustrate a modified form of my invention, having the outer face of the stationary member 16 rounded as at 60, and the inner face of the revoluble member 17 rounded as at 61. In this embodiment I employ different means for retaining the revoluble member 17 to the stationary member 16 against longitudinal movement. I transversely slit the inner end 26 of the base before assembly as at 63, and after assembly force the upper edge 64 thereof up over the rounded inner face 61 of the revoluble member 17 (see Fig. 13). Said edge 64, however, may be split off and burnished over with a chisel or suitable tool after assembly.

Figure 16:
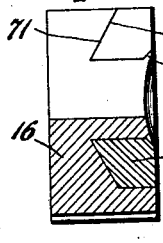
Fig. 16 is a sectional view of a modified form of safety catch embodying my invention employing a lesser amount of metal.
Figure 17:
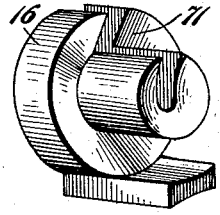
Fig. 17 is a perspective view of the stationary member thereof.
Figure 18:
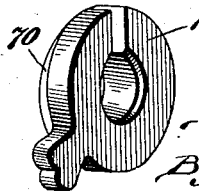
Fig. 18 is a perspective view of the revoluble member thereof.

Figs. 16, 17 and 18 illustrate another modified form of my invention, wherein the outer surface of the revoluble member 17 may be convexed as at 70, to fit into the concaved contacting inner surface 71 of the stationary member 16. Said concaved and convexed surfaces may be rounded or straight as shown. It is obvious that these may be cut on an automatic machine and that this configuration not only saves metal by permitting the members 16 and 17 to be made correspondingly thinner, but also permits of a more even bearing surface.

From the above description, it is obvious that my invention may be readily constructed out of standard wire stock with a minimum number of operations on an automatic screw or similar type of automatic machine. The whole bar may be first machined down leaving projections for the base 20 and finger piece 38. These may then be suitably formed by suitable tools, one longitudinal slot cut in the composite member, the base portion suitably longitudinally axially slotted and the trunnion suitably separated from the annular member 17, by a turret cutting tool, the annular transverse slot between the stationary and revoluble members cut by a suitable cutting tool, thus separating the revoluble annular member 17 from the stationary member 16. The end 33 of the trunnion 22 may then be concaved, the lower surface 23 of the base 20 concaved, and the outer end 42 of the inner periphery 28 of the ring 17 bevelled by suitable tools.

Figure 11:
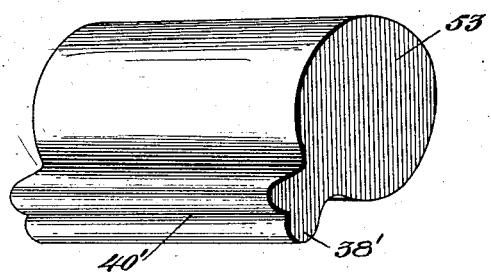
Fig. 11 is a perspective view of a piece of wire stock drawn with a finger piece protuberance thereon.
Figure 10:
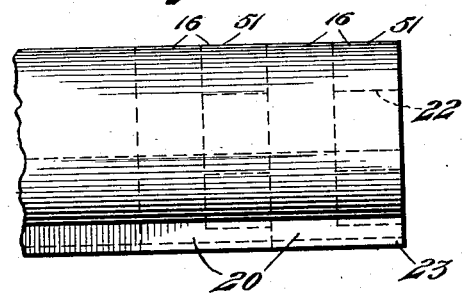
Fig. 10 is a side elevation of the same illustrating how a plurality of stationary members (shown in dotted lines) may be readily cut therefrom.
Figure 12:
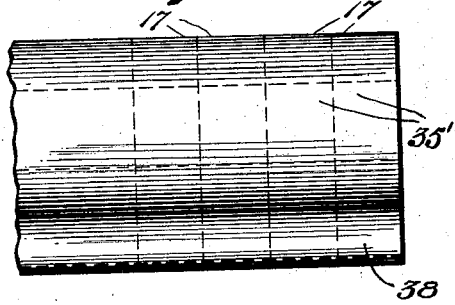
Fig. 12 is a side elevation of the same illustrating how a plurality of revoluble members (shown in dotted lines) may be readily cut therefrom.

For economy of construction and to obviate the difficulty and expense of forming the irregular base 20 and irregular finger piece 38 from a standard piece of wire stock on an automatic screw, turret or other type of automatic machine, the wire may first be drawn in irregular shape as illustrated in Figs. 9 to 12. Fig. 9 shows a piece of wire stock 50 drawn to have the irregular axial protuberance 20′ extending longitudinally thereof of the configuration of the desired finished base 20 of each individual safety catch 15. Said protuberance may be provided with a concaved portion 23′. Fig. 10 illustrates in dotted lines how a plurality of stationary members 16 may be cut from said irregular stock 50. It will be observed that the annular portions 51 cut away from the trunnion 22 will be waste stock. This, however, may be saved as waste. This method is probably cheaper even with the waste than the cost of labor and time consumed in cutting out the base protuberance 20 from a standard piece of wire stock on an automatic machine. Fig. 11 illustrates a piece of wire stock 53 drawn to have the irregular axial protuberance 38′ extending longitudinally thereof of the configuration of the finger pieces 38 with their finger depressions 40. Fig. 12 illustrates in dotted lines how a plurality of revoluble members 17 may be cut from said irregular piece of wire stock 53 leaving as waste only the bore portions 35′. The further bevelling and countersinking operations necessary may be readily made on an automatic machine of the turret or similar type.

To assemble, insert the revoluble member 17 over the trunnion 22, with a suitable tool bend over the outer periphery 41 of the concaved or otherwise countersunk headed end 33 of the trunnion 22 over the bevelled or otherwise countersunk end 42 of the member 17, as shown in Fig. 5, thereby securing the revoluble member 17 to the stationary member 16 against longitudinal movement, or bend the edge 64 of the inner end 26 of the base 20 of the stationary member 16 over the rounded inner surface 61 of the revoluble member 17 as shown in Fig. 13. The base 20 of the assembled catch 15 may then be suitably soldered to the desired position on the pin body portion 10. This positive ease of assembly is possible, as the guard member 17 and stationary member 16 are so to speak the complements of each other, being conveniently cut from the same piece of wire stock.

As stated, the finger piece 38 is raised on the revoluble member 17, a predetermined distance away from the longitudinal slot 36. Figs. 1 and 6 show the catch in open position, the finger piece 38 thus abutting the pin body portion 10 to align the longitudinal slot 36 in the revoluble member 17 with the longitudinal slot 30 in the stationary member 16, for the purpose of inserting and withdrawing the end 47 of the pin tongue 11. Fig. 6 shows the end 47 of the pin tongue 11 being inserted in the safety catch 15. When this is done, to lock the catch 15, it is merely necessary to grasp the finger piece 38 and swing the revoluble member 17 until the slots 30—36 are out of alignment, the solid annular portion of the member 17 thus serving to retain the pin tongue 11 in the slot 30. The ring 17 is preferably revolved until the opposite edge of the finger piece 38 abuts the body portion 10 on the opposite side of the catch 15, as shown in dotted lines in Fig. 1.

As the outer periphery 27 of the revoluble member 17 continually abuts the concaved upper surface 25 of the base 20, it is obvious that it is impossible to bend over the catch so as to get it out of alignment with the end 47 of the pin tongue 11.

Though I have described a catch that may be made on an automatic screw machine, it is obvious that it can be made by hand or on any other suitable machine. I employ the terms inwardly and outwardly with reference to the longitudinal center of the pin, and upwardly and downwardly with reference to the pin body portion.

It is apparent that I have provided a structure which can be easily constructed, assembled and manipulated.

It is understood that my invention is not limited to the specific embodiments or processes shown and described, and that various deviations may be made therefrom without departing from the spirit and scope of the appended claims.

What I claim as new and desire to secure as Letters Patent is:—

1. A safety catch for pins and the like, having a body portion and a pin tongue pivoted thereon, comprising in combination a longitudinally slotted stationary member securely attached to the pin body portion, having a cylindrical trunnion projecting longitudinally therefrom, and a longitudinally slotted guard member revolubly mounted on said trunnion and secured to the trunnion against longitudinal movement.

2. A safety catch for pins and the like, having a body portion and a pin tongue pivoted thereon, comprising in combination a longitudinally slotted stationary member securely attached to the pin body portion having a cylindrical trunnion projecting longitudinally therefrom and a longitudinally slotted guard member revolubly mounted on said trunnion and secured to the stationary member against longitudinal movement, and having a finger piece projecting radially therefrom spaced from said slot to abut the pin body portion to align the slots to receive the pin tongue therein, said guard member being adapted on partial revolution thereof to retain said pin tongue in the slot in the stationary member.

3. A safety catch for pins and the like, having a body portion and a pin tongue pivoted thereon, comprising in combination a member having a base secured to the pin body portion, having a concave upper surface at one end thereof, a body portion projecting upwardly from the other end of said base having a cylindrical trunnion projecting longitudinally therefrom over the concave upper surface of said base, said member being longitudinally slotted to receive the pin tongue therein, and a longitudinally slotted annular guard member revolubly mounted on said trunnion to bear against the concaved upper surface of said base, and secured to the stationary member against longitudinal movement, and having a finger piece projecting radially therefrom, spaced from said slot to abut the pin body portion to align said slots to receive the pin tongue therein, said guard member being adapted on partial revolution thereof to retain said pin tongue in the slot in the stationary member.

4. A safety catch for pins and the like, having a body portion and a pin tongue pivoted thereon, comprising a longitudinally slotted stationary member having a transversely concaved base adapted to receive solder therein to firmly attach said stationary member to the pin body portion and having a cylindrical trunnion projecting longitudinally therefrom and a longitudinally slotted guard member revolubly mounted on said trunnion, and secured to the stationary member against longitudinal movement.

5. A safety catch for pins and the like, having a body portion and a pin tongue pivoted thereon, comprising in combination a member having a transversely concaved base adapted to receive solder therein to firmly attach said stationary member to the pin body portion, having a concaved upper surface at one end thereof, a body portion projecting upwardly from the other end of said base having a cylindrical trunnion projecting longitudinally therefrom over the concave upper surface of said base, said member being longitudinally slotted to receive the pin tongue therein, and a longitudinally slotted annular guard member revolubly mounted on said trunnion to bear against the concaved upper surface of said base, and secured to the stationary member against longitudinal movement, and having a finger piece projecting radially therefrom, spaced from said slot to abut the pin body portion to align said slots to receive the pin tongue therein, said guard member being adapted on partial revolution thereof to retain said pin tongue in the slot in the stationary member.

6. A safety catch for pins and the like, having a body portion and a pin tongue pivoted thereon, comprising in combination a member having a base secured to the pin body portion having a concaved upper surface at one end thereof, a body portion projecting upwardly from the other end of said base having a cylindrical trunnion projecting longitudinally therefrom over the concaved upper surface of said base, said member being longitudinally slotted to receive the pin tongue therein, and a longitudinally slotted annular guard member revolubly mounted on said trunnion to bear against the concaved upper surface of said base and secured to the stationary member against longitudinal movement.

7. A safety catch for pins and the like, having a body portion and a pin tongue pivoted thereon, comprising in combination a longitudinally slotted stationary member securely attached to the pin body portion, having a cylindrical trunnion projecting longitudinally therefrom, having a countersunk headed end and a longitudinally slotted guard member, having a longitudinal bore for revolubly mounting on said trunnion, said bore having one end thereof countersunk to receive the countersunk headed end of the trunnion therein, to secure said revoluble member to the stationary member against longitudinal movement thereon.

8. A safety catch for pins and the like, having a body portion and a pin tongue pivoted thereon, comprising in combination a longitudinally slotted stationary member securely attached to the pin body portion, having a cylindrical trunnion projecting longitudinally therefrom, having a countersunk headed end and a longitudinally slotted guard member, having a longitudinal bore for revoluble mounting on said trunnion, said bore having one end thereof countersunk to receive the countersunk headed end of the trunnion therein, to secure said revoluble member to the stationary member against longitudinal movement thereon, and having a finger piece projecting radially therefrom spaced from said slot to abut the pin body portion to align the slots to receive the pin tongue therein, said guard member being adapted on partial revolution thereof to retain said pin tongue in the slot in the stationary member.

9. A safety catch for pins and the like, having a body portion and a pin tongue pivoted thereon, comprising in combination a member having a base secured to the pin body portion, having a concave upper surface at one end thereof, a body portion projecting upwardly from the other end of said base having a cylindrical trunnion provided with a countersunk headed end projecting longitudinally therefrom over the concave upper surface of said base, said member being longitudinally slotted to receive the pin tongue therein, and a longitudinally slotted annular guard member having a longitudinal bore for revoluble mounting thereof on said trunnion to bear against the concaved upper surface of said base, said bore having one end thereof countersunk to receive the countersunk headed end of the trunnion therein, to secure said revoluble member to the stationary member against longitudinal movement thereon, and having a finger piece projecting radially therefrom, spaced from said slot to abut the pin body portion to align said slots to receive the pin tongue therein, said guard member being adapted on partial revolution thereof to retain said pin tongue in the slot in the stationary member.

10. A safety catch for pins and the like, having a body portion and a pin tongue pivoted thereon, comprising in combination a longitudinally slotted stationary member securely attached to the pin body portion, having a cylindrical trunnion projecting longitudinally therefrom having a concaved end, and a longitudinally slotted guard member having a longitudinal bore for revoluble mounting on said trunnion, said bore having a bevelled end adapted to receive the upset concaved end of the trunnion to secure the revoluble member to the stationary member against longitudinal movement thereon.

11. A safety catch for pins and the like, having a body portion and a pin tongue pivoted thereon, comprising in combination a longitudinally slotted stationary member securely attached to the pin body portion having a cylindrical trunnion projecting longitudinally therefrom, having a concaved end and a longitudinally slotted guard member, having a longitudinal bore for revoluble mounting on said trunnion, said bore having a bevelled end adapted to receive the upset concaved end of the trunnion to secure the revoluble member to the stationary member against longitudinal movement thereon, and having a finger piece projecting radially therefrom spaced from said slot to abut the pin body portion to align the slots to receive the pin tongue therein, said guard member being adapted on partial revolution thereof to retain said pin tongue in the slot in the stationary member.

12. A safety catch for pins and the like, having a body portion and a pin tongue pivoted thereon, comprising in combination a member having a base secured to the pin body portion, having a concave upper surface at one end thereof, a body portion projecting upwardly from the other end of said base having a cylindrical trunnion, having a concaved end projecting longitudinally therefrom over the concave upper surface of said base, said member being longitudinally slotted to receive the pin tongue therein, and a longitudinally slotted annular guard member, having a longitudinal bore for revoluble mounting on said trunnion to bear against the concaved upper surface of said base, said bore having a bevelled end adapted to receive the upset concaved end of the trunnion to secure the revoluble member to the stationary member against longitudinal movement thereon, and having a finger piece projecting radially therefrom, spaced from said slot to abut the pin body portion to align said slots to receive the pin tongue therein, said guard member being adapted on partial revolution thereof to retain said pin tongue in the slot in the stationary member.

13. A safety catch for pins and the like, having a body portion and a pin tongue pivoted thereon, comprising a longitudinally slotted stationary member having a transversely concaved base adapted to receive solder therein to firmly attach said stationary member to the pin body portion and having a cylindrical trunnion projecting longitudinally therefrom, having a concaved end and a longitudinally slotted guard member having a longitudinal bore for revoluble mounting on said trunnion, said bore having a bevelled end adapted to receive the upset concaved end of the trunnion to secure the revoluble member to the stationary member against longitudinal movement thereon.

14. A safety catch for pins and the like, having a body portion and a pin tongue pivoted thereon, comprising in combination a member having a transversely concaved base adapted to receive solder therein to firmly attach said stationary member to the pin body portion, having a concaved upper surface at one end thereof, a body portion projecting upwardly from the other end of said base having a cylindrical trunnion, having a concaved end projecting longitudinally therefrom over the concave upper surface of said base, said member being longitudinally slotted to receive the pin tongue therein, and a longitudinally slotted annular guard member, having a longitudinal bore for revoluble mounting on said trunnion to bear against the concaved upper surface of said base, said bore having a bevelled end adapted to receive the upset concaved end of the trunnion to secure the revoluble member to the stationary member against longitudinal movement thereon, and having a finger piece propecting radially therefrom, spaced from said slot to abut the pin body portion to align said slots to receive the pin tongue therein, said guard member being adapted on partial revolution thereof to retain said pin tongue in the slot in the stationary member.

15. A safety catch for pins and the like, having a body portion and a pin tongue pivoted thereon, comprising in combination a member having a base secured to the pin body portion having a concaved upper surface at one end thereof, a body portion projecting upwardly from the other end of said base having a cylindrical trunnion, having a concaved end projecting longitudinally therefrom over the concaved upper surface of said base, said member being longitudinally slotted to receive the pin tongue therein, and a longitudinally slotted annular guard member, having a longitudinal bore for revoluble mounting on said trunnion, said bore having a bevelled end adapted to receive the upset concaved end of the trunnion to secure the revoluble member to the stationary member against longitudinal movement thereon.

16. A safety catch for pins and the like, having a body portion and a pin tongue pivoted thereon, comprising in combination a longitudinally slotted stationary member securely attached to the pin body portion, having a cylindrical trunnion projecting longitudinally therefrom, and a longitudinally slotted guard member revolubly mounted on said trunnion and secured to the stationary member against longitudinal movement, having a finger piece projecting radially therefrom, spaced at a predetermined distance from said slot, said guard member being adapted on partial revolution thereof to retain said pin tongue in the slot in the stationary member.

17. A safety catch for pins and the like, having a body portion and a pin tongue pivoted thereon, comprising in combination a member having a base secured to the pin body portion, having a concave upper surface at one end thereof, a body portion projecting upwardly from the other end of said base having a cylindrical trunnion projecting longitudinally therefrom over the concave upper surface of said base, said member being longitudinally slotted to receive the pin tongue therein, and a longitudinally slotted annular guard member revolubly mounted on said trunnion to bear against the concaved upper surface of said base, and secured to the stationary member against longitudinal movement, having a finger piece projecting radially therefrom, spaced at a predetermined distance from said slot, said guard member being adapted on partial revolution thereof to retain said pin tongue in the slot in the stationary member.

18. A safety catch for pins and the like having a body portion and a pin tongue pivoted thereon, comprising in combination, a longitudinally slotted stationary member securely attached to the pin body portion and a longitudinally slotted guard revolubly mounted thereon, one of said members having a cylindrical trunnion projecting longitudinally therefrom, and the other of said members having a longitudinal bore therein for mounting on said trunnion and means at the end of said trunnion adapted to cooperate with means on said other member to secure said members against longitudinal movement.

19. A safety catch for pins and the like having a body portion and a pin tongue pivoted thereon, comprising in combination, a longitudinally slotted stationary member securely attached to the pin body portion and a longitudinally slotted guard member revolubly mounted thereon, one of said members having a cylindrical trunnion projecting longitudinally therefrom, and the other of said members having a longitudinal bore therein for mounting on said trunnion and means at the end of said trunnion adapted to cooperate with means on said other member to secure said members against longitudinal movement, said guard member having a finger piece projecting radially therefrom spaced from said slot to abut the pin body portion to align the slots to receive the pin tongue therein, said guard member being adapted on partial revolution thereof to retain said pin tongue in the slot in the stationary member.

20. A safety catch for pins and the like having the body portion and a pin tongue pivoted thereon, comprising in combination, a longitudinally slotted stationary member securely attached to the pin body portion and a longitudinally slotted guard member revolubly mounted thereon, one of said members having a cylindrical trunnion projecting longitudinally therefrom, and the other of said members having a longitudinal bore therein for mounting on said trunnion and means at the end of said trunnion adapted to cooperate with means on said other member to secure said members against longitudinal movement, said guard member having a finger piece projecting radially therefrom spaced at a predetermined distance from said slot, said guard member being adapted on partial revolution thereof to retain said pin tongue in the slot in the stationary member.

In testimony whereof I affix my signature.

ALFRED VEILLETTE.